US007180860B2

(12) United States Patent
Fonden et al.

(10) Patent No.: US 7,180,860 B2
(45) Date of Patent: Feb. 20, 2007

(54) METHOD AND DEVICES TO PROVIDE A DEFINED QUALITY OF SERVICE IN A PACKET SWITCHED COMMUNICATION NETWORK

(75) Inventors: Benny Fonden, Lidköping (SE); Ralf Keller, Würselen (DE); Dirk Kopplin, Göteburg (SE); Thorsten Lohmar, Aachen (DE); Hans-Olof Sundell, Öckerö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 963 days.

(21) Appl. No.: 09/742,857

(22) Filed: Dec. 20, 2000

(65) Prior Publication Data

US 2004/0202156 A1 Oct. 14, 2004

(30) Foreign Application Priority Data

Dec. 23, 1999 (EP) ................................. 99125719

(51) Int. Cl.
*H04L 12/56* (2006.01)
*H04L 12/46* (2006.01)

(52) U.S. Cl. .................. 370/235; 370/352; 370/395.21

(58) Field of Classification Search ........ 370/229–237, 370/252–253, 352–356; 709/229

See application file for complete search history.

(56) References Cited

U.S. PATENT DOCUMENTS

| | | | | |
|---|---|---|---|---|
| 5,881,050 A | 3/1999 | Chevalier et al. | ........... | 370/230 |
| 6,021,263 A * | 2/2000 | Kujoory et al. | ............. | 709/232 |
| 6,058,108 A * | 5/2000 | Raith et al. | ................. | 370/337 |
| 6,092,108 A * | 7/2000 | DiPlacido et al. | .......... | 709/224 |
| 6,286,052 B1 * | 9/2001 | McCloghrie et al. | ....... | 709/238 |
| 6,446,122 B1 * | 9/2002 | Rawat et al. | ............... | 709/224 |
| 6,661,782 B1 * | 12/2003 | Mustajarvi et al. | ......... | 370/331 |
| 6,765,927 B1 * | 7/2004 | Martin et al. | ............... | 370/469 |

(Continued)

FOREIGN PATENT DOCUMENTS

EP 0913970 A1 5/1999

OTHER PUBLICATIONS

La Porta, T.F., et al; "Mobile IP and wide area wireless data"; Sep. 21-24, 1999; IEEE Wireless Communications and Networking Conference; vol. 3, pp. 1528-1532.*

(Continued)

*Primary Examiner*—Seema S. Rao
*Assistant Examiner*—Robert C. Scheibel, Jr.

(57) ABSTRACT

A method for the provision of a defined quality of service in a packet switched communication system with interconnected nodes (N) for the forwarding of data packets is described. The system comprises at least one edge node (EN) for the connection to user equipment (UE) or a further communication system (FS) and for processing data packets. The packets comprise a data field (10) specifying the handling of the packets and the nodes (N) perform a differentiated handling of packets according to said data field (10). The communication system comprises or is connectable to a data base (DB) which contains a record for a user specifying a quality of service. An edge node (EN) which processes a packet for said user is provided with quality parameters from the data base (DB). The edge node (EN) sets the data field (10) specifying the handling of the packet according to the record. Devices and programs to perform the method are also described.

13 Claims, 3 Drawing Sheets

U.S. PATENT DOCUMENTS

| | | | | |
|---|---|---|---|---|
| 6,879,834 | B2 * | 4/2005 | Virtanen | 455/452.2 |
| 6,917,617 | B2 * | 7/2005 | Jin et al. | 370/395.21 |
| 2005/0047337 | A1 * | 3/2005 | Virtanen | 370/229 |

OTHER PUBLICATIONS

Kent, S. et al, "Security Architecture for the Internet Protocol", Nov. 1998, IETF Network Working Group, RFC 2401.*

Cichra, M., European Search Report, App. No. EP 99125719, Jun. 7, 2000, pp. 1-3.

Bilgic, M. et al., "Quality of Service in General Packet Radio Service," 1999 IEEE International Workshop on Mobile Multimedia Communications, (Cat. No. 99EX384) Nov. 15-17, 1999, pp. 226-231, XP-002139606.

Blake, S. et al., "An Architecture for Differentiated Services," Request for Comments 2475, IETF Network Working Group, Dec. 1998, pp. 1-31, XP-002139608.

Nichols, K. et al., "RFC 2474—Definition of Differentiated Services Field (DS Field) in the IPv4 and IPv6 Headers," IETF Network Working Group, Dec. 1998, pp. 1-17.

Nichols, K. et al., "RFC 2474—Definition of Differentiated Services Field (DS Field)," IETF Network Working Group, Dec. 1998, pp. 11-19, XP002139607.

Draft ETSI EN 301 344 V6.4.0 (Aug. 1999), Digital Cellular Telecommunications System (Phase 2+);General Packet Radio Service (GPRS); Service Description; Stage 2 (GSM 03.60 version 6.4.0 Release 1997), pp. 1-108

International Search Report dated Mar. 29, 2001.

* cited by examiner

METHOD AND DEVICES TO PROVIDE A DEFINED QUALITY OF SERVICE IN A PACKET SWITCHED COMMUNICATION NETWORK

TECHNICAL FIELD OF THE INVENTION

The present invention relates to a method according to the preamble of claim 1. Furthermore, devices and software programs for a communication system are described.

BACKGROUND

A packet switched communication system like the internet comprises interconnected nodes for the forwarding of data packets. Edge nodes connect the communication system to user equipment or further communication systems. Presently data packets in the internet are processed according to best effort service, i.e. all data packets are processed with equal priority.

In order to provide a defined quality of service for the internet which supplements the best effort service, the differentiated services model was introduced (IETF RFC 2474 and 2475). In the differentiated services model, a data field in the data packets specifies the handling at the nodes which forward them. The packet header according to the internet protocol (IP) of both IP version 4 and IP version 6 comprises a data field which is denoted as differentiated services (DS) field and has a length of 8 bits. The nodes perform a differentiated handling of the packets according to the first 6 bits of the DS field which specify the per hop behavior while the last two bits are presently not used. Correspondingly, it has been proposed that the definition of the DS field in the IP protocol should only comprise the bits specifying the per hop behavior instead of the entire DS field.

According to the value of the per hop behavior, a decision is performed in the node whether, in which way and with which priority packets are queued or if the packets can be dropped in case of congestion in the node. The default handling is the present best effort service. Other per hop behaviors which have been proposed represent for example expedited forwarding (EF) of the packets or assured forwarding (AF).

In communication systems like GSM (global system for mobile communications) or subscriptions which correspond to different traffic precedences (European Standard ETSI EN 301 344 V 6.4.0; 3rd Generation Partnership Project, Technical Specification 3G TS 23.060 V 3.1.0). Subscription information specifying the resources which are to be allocated for forwarding traffic of the user are stored in a data base in the system. Generally, a record is kept in a data base denoted as the home location register (HLR) serving the user, in many systems with a copy in a visitor register (VLR) serving the area in which the user is presently located. If a connection is set up for the user, a data base is contacted which resources, for example bandwidth, are to be allocated to the user for the connection to the core network, e.g. on the radio link. It is possible that a negotiation process with the user equipment is performed during the access and the allocated resources differ from the record entry by taking into account the available resources under the present traffic conditions.

In the core network which interconnects the nodes for the access of the communication system, data and control signaling is often forwarded as packet switched traffic. As an example, in the GPRS (general packet radio service) and UMTS core network, the internet protocol is used for routing traffic on the routing layer evaluated by the nodes forwarding the packets. Correspondingly, connections are often packet switched sessions wherein the packets of a connection can be routed over different links and the traffic on a connection is not necessarily continuous.

If the traffic load in the core network is high, the forwarding of the data packets bearing the traffic through the core network is of increasing importance. No method is presently available in the core network to distinguish between different user subscriptions. It is only possible to specify a traffic priority which can be set by any user according to his wishes and which does, therefore, depend highly on the behavior of other users. Consequently, the traffic of users is forwarded in the core network without predictable priority and messages can be delayed in case of congestion. Especially delay sensitive applications can be impaired, even if the resources allocated to the user in the access network are sufficient for the connection.

SUMMARY OF THE INVENTION

According to the invention, the method described in claim 1 is performed. The invention is also embodied in devices and software programs as described in claims 11, 16 and 18. Advantageous embodiments are described in claims 2 to 10, 12 to 15, 17 and 19.

In the proposed method, the communication system comprises a data base which contains a record for a user, generally a personal record for every user. The record specifies which quality of service is to be provided to the user. It is possible that records for more than one or all users are contained in a single file. Furthermore, standard records can be provided, e.g. for roaming users from further communication systems without individual records. An edge node which processes a packet for said user before sending it to a further node in the communication system, especially in the core network, is provided with the record from the data base or at least those parameters from the record which are necessary to determine the quality of service which is to be provided for the connection requested by the user. The position of the edge node can deviate from the edge of the core network as it is possible to perform the proposed method in a larger or smaller domain than a core network. The edge node can be for example a GGSN (GPRS gateway support node) which forwards data packets from a different network to the core network, an SGSN (serving GPRS support node) which presently serves the user or an RNC (radio network controller) which controls the set up of a radio link to the user and creates the packets sent into the core network from data sent by the user.

According to the information provided from the data base, the edge node sets the differentiated services (DS) data field, generally in the packet header, which specifies the handling of the packet. The packets can be sent either to or from the user wherein the direction of the traffic determines which edge node sets the DS data field. If the record does not comprise a parameter for the connection, the DS data field is set to a default value, preferably best effort service.

The edge node can consist of several distinct devices which can be located remote from each other. Especially it is possible that the edge node comprises control devices, e.g. mobiles services switching centers (MSC), and devices for the processing and forwarding of the data traffic, e.g. a media gateway, wherein one or several control devices control the processing device. In this case, a control device can obtain the user record from the data base and forward parameters for the setting of the data field to one or several nodes for the processing of the data traffic. It is possible that a single control device controls two edge nodes in a connection, e.g. two SGSN media gateways or an SGSN media gateway and a GGSN media gateway, which are then preferably both provided with parameters for the setting of the data field from the control device.

In common communication systems, a layered protocol stack is defined wherein user data are repeatedly enclosed in data packets. In this case, the DS data field has to be specified on the routing layer which is evaluated by the nodes forwarding the data packets through the network. The term "application layer" denotes throughout the present text an application layer with respect to the routing layer of the core network. Therefore, the application layer can have a different function with respect to an application running on the user equipment.

The proposed method provides the opportunity to control the forwarding of data packets according to a user subscription in a packet switched network. Therefore, the traffic can be forwarded according to the subscription throughout the entire communication system including the core network. An operator can offer selected sets of traffic qualities to users with selected subscriptions. The method can also be used to control the access to specific nodes or services in the system. It is possible that one or several possible settings of the DS data field are not accessible for any user packets and are reserved for high priority traffic of the operator, especially network control. The method can be used to differentiate between users from different access networks or between users located in their home area and roaming users. For this purpose, a user record can contain different entries for the same type of connection depending for example on the edge node or the type of edge node. It is also possible that the quality of service differs for different connections of a user or for the uplink and downlink packets of a connection. The method has the advantage that it is easy to implement. It is especially suitable for the core networks of UMTS and GPRS communication systems.

A user often requests different defined qualities of service for delay and error sensitive applications and for applications which tolerate delays or errors or both. In a preferred embodiment of the invention, the DS data field is specified both according to the requested quality of service and according to the record from the data base. This offers the opportunity to distinguish different priorities and service classes between traffic processed for users with the same type of subscription.

An information about the requested quality of service is in many cases available on the application layer, especially if data packets sent by or destined for the user comprise a DS field according to the IP protocol with a specified per hop behavior. The information about the requested quality of service can also be present on a different layer in the protocol stack of an edge node, as the application layer is not always processed in an edge node like in an RNC. Preferably, the edge node receiving the data packet first and processing it for further forwarding through the core network evaluates the information on the application layer or another layer and sets the DS data field on the routing layer evaluated by the forwarding nodes accordingly. In a simple embodiment, a DS field on the application layer is copied to the DS data field if the requested priority is covered by the user subscription and is set to a default value else. Alternatively, an edge node can specify the DS data field differently from the requested behavior. The operator of the network has the opportunity to define individual mappings according to a user record and to adapt the mapping to the processing characteristics of the nodes in the communication system.

If a negotiation process is performed with the user equipment during the access of the communication system, the allocated resources for the connection to the communication system can differ from the user record by taking into account the available resources under the present traffic conditions. In these cases, the DS data field is preferably also specified according to the traffic load in the communication system which was used in the negotiation process or according to the result of the negotiation process, i.e. the parameters evaluated in the specification of the data field comprise the user record, the traffic load and, optionally, a user request. This avoids differences in the traffic priority between different parts of the communication system.

Some edge nodes do not have the capability to access the data base containing the user record for a transfer of the data necessary for the setting of the DS data field. In these cases, it is preferable that a second node with this capability accesses the data base and forwards the information to the edge node which processes packets for said user. An example is a transfer of data from the user through the core network wherein the data packets are created in an RNC. The parameters for the setting of the DS data field are requested from the data base, e.g. an HILR, by the SGSN which serves the RNC. The parameters are then transferred from the SGSN to the RNC. Another example is a connection through two edge nodes of the network which both require the subscription information to set the DS data field for packets in uplink and downlink direction, respectively, although the setting can differ for both directions. When the connection is set up from the first edge node, e.g. the SGSN serving the user, it is provided with the information from the data base and can forward it to the other edge node, e.g. a GGSN connecting the user to a host in a further network. In this way, the other edge node obtains the subscription information without the necessity to contact the database. A transfer of subscription information between nodes is also preferable if the communication system comprises different nodes for the forwarding and control of traffic. If the nodes processing the traffic, e.g. media gateways, are controlled by one or several other nodes, e.g. MSCs, the information is preferably obtained from the data base by the controlling node and forwarded to one or several nodes processing the traffic. A transfer of subscription information between nodes can reduce the processing load of a central base significantly.

Preferably, the data packets are Internet protocol (IP) packets, for example of IP version 4 or IP version 6. The IP is proposed as protocol for the routing layer in the GPRS and UMTS core networks, wherein user IP packets are encapsulated consecutively in GTP (GPRS Tunneling Protocol) PDUs (Packet Data Units), UDP (User Datagram Protocol) PDUs and IP PDUs for the routing through the core network. Therefore, the implementation of the invention using the DS field in the header of the IP packets on the routing layer of the core network as DS data field requires only a moderate effort.

The DS field according to the IP protocol comprises two bits which are presently unspecified and unused, i.e. not evaluated by nodes supporting the IP differentiated service. It is proposed that the unspecified bits are set according to the record and the packet handling is performed according to these bits. An advantage of this embodiment is that the per hop behavior can be copied from IP packets on the application layer. An enlarged number of handling categories is provided. In this way, it is possible to handle the packets alternatively according to the user specification, the user subscription or a combination of both, for example depending on the load in a node or the communication network.

The bits specifying the per hop behavior in the DS field of the IP header can also be set according to the record in the data base. In this case, the per hop behavior can either be set only according to the parameters contained in the data base for the requested type of connection. Else, both the quality of service requested by the user, e.g. a per hop behavior specified on the application layer, and the parameters in the user record are evaluated for a mapping of transport classes. The latter approach is preferable if the forwarding behavior of the nodes in the communication system differs from customary IP nodes and the per hop behavior requested by the application corresponds more closely to a different setting of the DS field on the routing layer.

The data base containing the user record is preferably a location register, for example a home location register (HLR) or a visitor location register (VLR). Alternatively, it can be an LDAP (light directory access protocol) server or a policy server in the communication network. It is possible that the user record in a location register contains only a service class for a user of while another server in the network provides the settings which correspond to the respective service class.

If a node in the system has sufficient resources to process all traffic with the same delay as the highest priority class, the evaluation of the DS data field requires computing time without providing benefits. Therefore, a node preferably evaluates the DS data field only if the traffic load is above a threshold value. Suitable thresholds correspond to the traffic limits above which at least a part of the traffic has to be processed with a higher delay or dropped.

An edge node according to the invention connects user equipment or a further communication system to the core network of a packet switched communication system with interconnected nodes for the forwarding of data packets. The edge node is connectable or permanently connected to a node for the forwarding of data packets. The packets comprise a data field for specifying the handling of the packets in the nodes of the core network. The edge node is provided with an interface over which a data base holding user records can be accessed. It is possible that the access is performed indirectly, i.e. to another node in the communication system which provides the information from the user record. A processing system and a memory in the edge node store the record or at least parameters specifying a quality of service for the user served. The processing system in the edge node sets the data field specifying the handling of the packet according to the specified quality of service and sends them into the core network.

The processing system in a preferable edge node processes data packets according to a protocol stack. In this case, the processing system can set the data field on the routing layer evaluated by the nodes for the handling of the packets according to data evaluated from a different layer in the protocol stack. For example, the processing system can read the setting of a differentiated services data field on the application layer and map the setting to the data field on the routing layer.

An advantageous edge node is a serving GPRS support node (SGSN) or a gateway GPRS support node (GGSN). The edge node can consist of different devices which can be located remote from each other. Especially, the edge node can comprise a control node and a node for processing packets, e.g. a media gateway. In this way, the invention can be adapted to communication system with a separate data and control plane. Preferably, the control node obtains the user record and provides one or several processing nodes with the setting of the data field for a specific connection of the user.

A radio network controller (RNC) or an adapter in the user equipment is also suitable as edge node. In this way, the differentiated services domain of the communication system can be larger than the core network.

A preferable node or router for the forwarding of data packets in a packet switched communication system with interconnected nodes has a processing system which performs a differentiated handling according to a data field in the packets. The data field specifies whether, in which way and with which priority packets are queued or if a packet can be dropped in case of congestion. Suitable data packets are internet protocol packets and the data field is preferably the differentiated services field in the internet protocol header. In an embodiment of the invention, the node evaluates the unspecified bits in the differentiated services field and performs the packet handling according to the unspecified bits.

More preferably, the node has monitoring devices which measure the traffic load of the node. A processing unit compares the measured load to a threshold value. Preferably, the node evaluates the data field only if the traffic load is above the threshold.

A program unit according to the invention can be stored on a data carrier like a magnetic or optical recording medium or it can be directly loadable into an edge node in a communication system. The program unit is part of the software for controlling the edge node. The edge node in which the program unit can be executed provides connections of a packet switched network to user equipment or a further communication system. The data packets comprise a data field according to which nodes in the communication system can perform a differentiated handling of the packets. The program unit comprises means for loading parameters for user equipment served by the edge node, the parameters specifying a quality of service for said user. The parameters can be provided for example as a record from a database. The program unit has means for setting the data field according to the parameters. The parameters can either represent the setting of the data field for the specific connection or the program unit comprises means to evaluate from the parameters which setting has to be used in the specific connection. The means in the program unit can be embodied as routines or subroutines in any programming language. The program unit can perform any steps of the methods described above.

The foregoing and other objects, features and advantages of the present invention will become more apparent in the following detailed description of preferred embodiments as illustrated in the accompanying drawings.

DETAILED DESCRIPTION OF THE INVENTION

Figure 1:
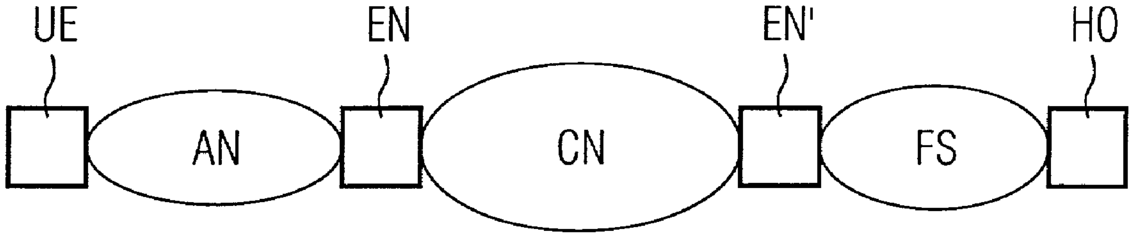
FIG. 1 shows a schematic representation of a communication system in which a method according to the invention is performed.

In FIG. 1, a communication system is schematically shown in which a method according to the invention is performed. User equipment UE, e.g. a mobile phone, a personal digital assistant, a laptop or another terminal is connected to a core network CN using an access network AN. The access network AN consists for example of a base station subsystem as it is known in GSM with base transceiver stations which are controlled by a base station controller. An alternative access network AN can be a UMTS terrestrial radio access network (UTRAN) with base stations controlled by a radio network controller (RNC). Wireless local area networks (WLAN) or a satellite network are also examples of suitable access networks AN. The controller or a node in the access network AN is in turn connected to a first edge node EN of the core network CN, e.g. a serving GPRS support node SGSN.

The core network is generally connected to further communication systems through further edge nodes EN', for example a gateway GPRS support node. The further communication system FS can for example be the core network of another mobile communication system or a fixed net communication system, e.g. the internet or a fixed telephone network. In the example, a host HO to which the user equipment UE sends and from which it receives data packets is connected to the further communication system FS.

Data packets sent between user equipment UE and host HO are processed in the access network AN with the quality of service to which the user has subscribed for the access network or with a negotiated quality which is defined during the access of the user according the present capabilities of the access network AN and to the subscription. In the further communication system FS, traffic may be processed without any defined quality of service, according to a differentiated services model or according to another model providing a defined quality of service. A differentiated service according to the invention is used in the core network CN, i.e. between the edge nodes EN, EN'. Therefore, the DS data field defining the handling of a data packet has to be set in the edge nodes EN, EN'.

The logical position of the edge nodes may deviate from the physical edge of the core network CN. Especially, if the access network AN can provide the same differentiated service as the core network CN, the edge node setting the DS data field can be located inside or at the edge of the access network. For example, it is possible that the edge node is an RNC in the access network serving the user equipment Ut or it is located in the user equipment Ut itself, e.g. in a terminal adapter. An edge node can also be located in the further communication system FS, if it supplies the same differentiated service as the core network CN.

Figures 2A, 2B:
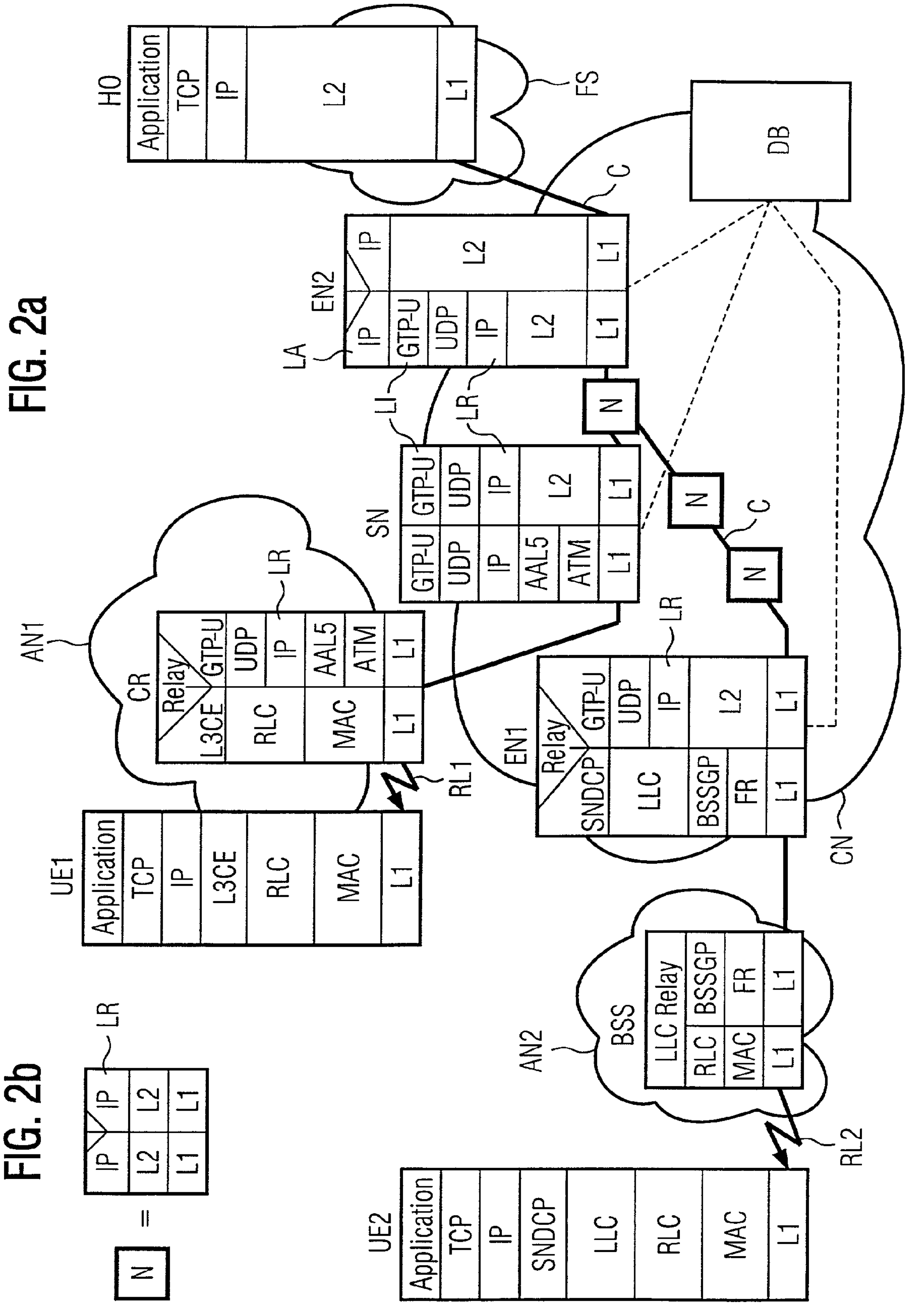
FIG. 2 shows a communication system with the protocol stacks processed in the nodes.

FIG. 2 shows a communication system in greater detail in which the method according to the invention is performed. The communication system in FIG. 2*a* comprises different access networks AN1, AN2 for the core network CN which is connected to one or several further communication systems FS. In a further communication system FS, a host HO is located which communicates with an application running on a user equipment UE1, UE2 with data packets sent through the core network CN. Preferable protocol stacks are indicated in the respective nodes of the communication system. Descriptions of the protocols and their interfaces can be found in the standards describing GPRS (European Standard ETSI EN 301 344) or UMTS (3G TS 23.060 V 3.1.0). A skilled person is aware that different protocols can be used in the stacks. For example, instead of the TCP protocol in the user equipment UE1, UE2 and host HO, a UDP protocol could be used. The IP protocol on layer LA could be replaced by an X.25 protocol or by a PPP (Point-to-Point Protocol).

In the example, the first access network AN1 is a UTRAN network controlled by a radio network controller CR. The logical position of the edge node in this case is for example the node SN, which can be a 3G SGSN, i.e. an SGSN according to UMTS specifications for connecting the controller CR to the core network CN. The edge node can also be the controller CR itself or it is part of the user equipment UE1, which is connected to the controller CR via a base station (not shown) and radio link RL1. The second access network AN2 is a GPRS base station subsystem (BSS) which is connectable to user equipment UE2 over a radio link RL2. In this case, the edge node EN of the core network CN is preferably the node EN1 because the IP protocol on the routing layer LR in the core network CN terminates here.

The core network CN generally comprises a plurality of nodes N and connections C of which only some are indicated to simplify the drawing. The protocol stacks for processing data packets in the nodes N is shown in FIG. 2*b*. The lower IP layer LR is evaluated by the nodes N in the core network CN for the routing of the packets. The header of IP packets on the routing layer LR comprises the DS data field which determines the processing by the nodes N. An IP protocol can also be used on the application layer LA, which is an application layer with respect to the routing layer LR. On an intermediate layer LI between the application layer LA and the lower IP layer LR, the GPRS tunneling protocol (GTP) is used for messages between the nodes in the core network. The GTP is especially suitable to forward parameters defining a quality of service to the edge nodes.

Furthermore, the core network CN comprises or is connectable to a data base DB, for example an HLR. The data base holds user records specifying which quality of service is to be provided to the user for a connection. The corresponding information can be sent to the nodes EN1, EN2, SN for the setting of the DS data field. The record and the data base DB can be identified for example from a user identification, e.g. from his subscriber number.

The DS data field in the header of the IP packets on layer LR is set according to the quality of service negotiated during the set up of the connection. Generally, the negotiated quality of service is at least equal to the quality of service to which the user has subscribed. The quality of service is negotiated with the user equipment UE1 when the connection, e.g. the radio access bearer for radio link RL1, is set up. The setting of the data field is valid for a specific microflow which is an application to application flow of packets defined by the senders and receivers addresses, the port numbers and the protocol identification. The properties for the microflow including the quality of service are transferred from the node SN to the controller CR which controls the radio link RL1 and the edge node EN2 in the GTP headers on layer LI. The corresponding setting of the data field is stored in the EN2 as long as the resources corresponding to the connection are assigned to the user equipment UE1. If the node EN2, for example a GGSN, consists of a media gateway for processing the data traffic and a control node, the parameters for the setting of the DS data field are provided via the control node to the media gateway.

Figure 3:
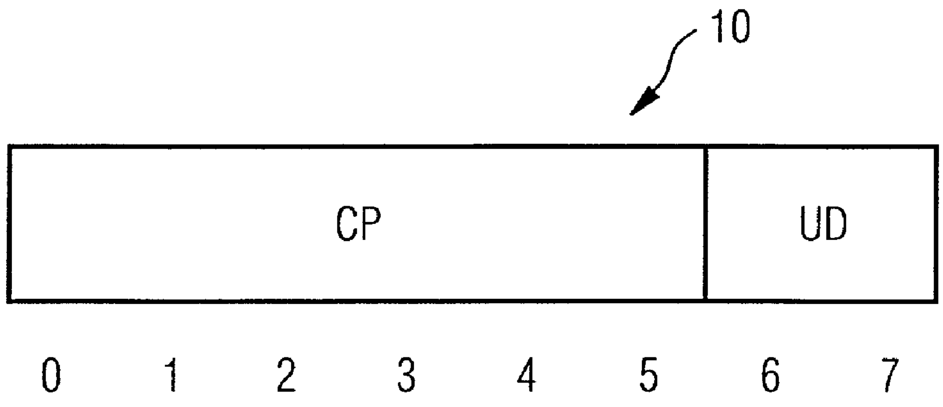
FIG. 3 shows the structure of a differentiated services data field in a method according to the invention.

FIG. 3 shows the structure of a differentiated services (DS) data field 10 in a first method according to the invention. The DS data field 10 is a byte in the header of IP packets and has a length of eight bits indicated by the figures at the lower edge of the field wherein the first six bits CP represent the per hop behavior of the data packet. The last two bits UD are not specified in present internet protocol standards. In one implementation of the invention, the bits UD define the priority according to the subscription of the user. In this way, it is possible to distinguish four different priority classes.

The DS field 10 is set in the edge node which processes the data for the routing layer LR of the core network CN of the communication system. The edge node itself needs not to be part of the core network, e.g. if the edge node is the controller CR in the access network AN1 of FIG. 2. The controller CR creates IP packets for layer LR which are then forwarded by the node SN into the core network CN. The bits UD defining the packet priority are set according to the user record in the data base DB of the core network CN. If a per hop behavior is defined in IP packets on the application layer LA which are sent by the user application or a host, the defined per hop behavior is copied into the bits CP in the DS field 10 of the packet header on layer LR. It is also possible to copy or map a requested quality of service from another layer in the protocol stack, e.g. the intermediate layer LI, especially if the application layer LA is not evaluated in the edge node. In these ways, it is possible to distinguish different priorities of data packets for users with the same subscription. Else the bits CP can be set to a default value. The nodes N in the core network CN which forward the data packets process them with the priority defined in the DS data field 10 wherein either the bits UD or the bits CP or both are considered.

Figure 4A:
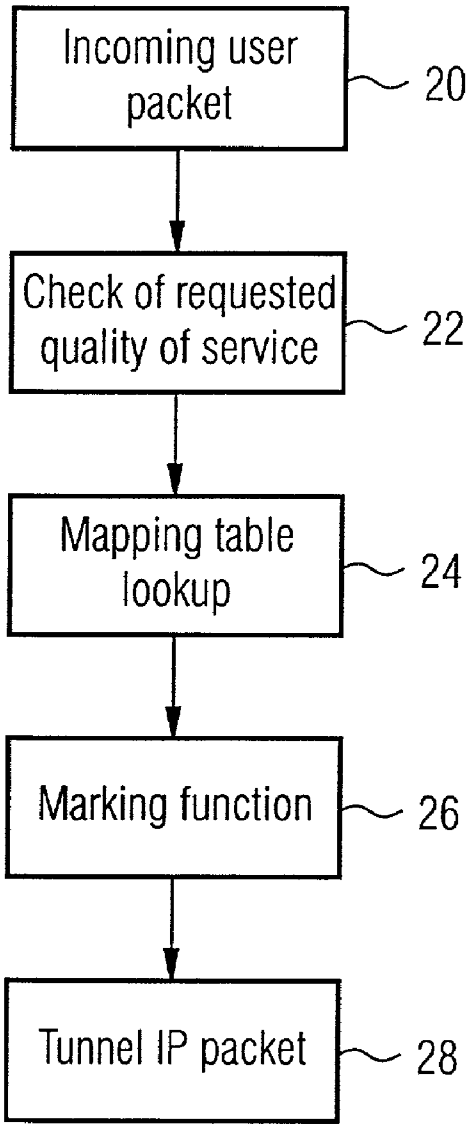
FIG. 4 shows flow charts for the marking of data packets sent in downlink and uplink direction, respectively, in a method according to the invention.
Figure 4B:
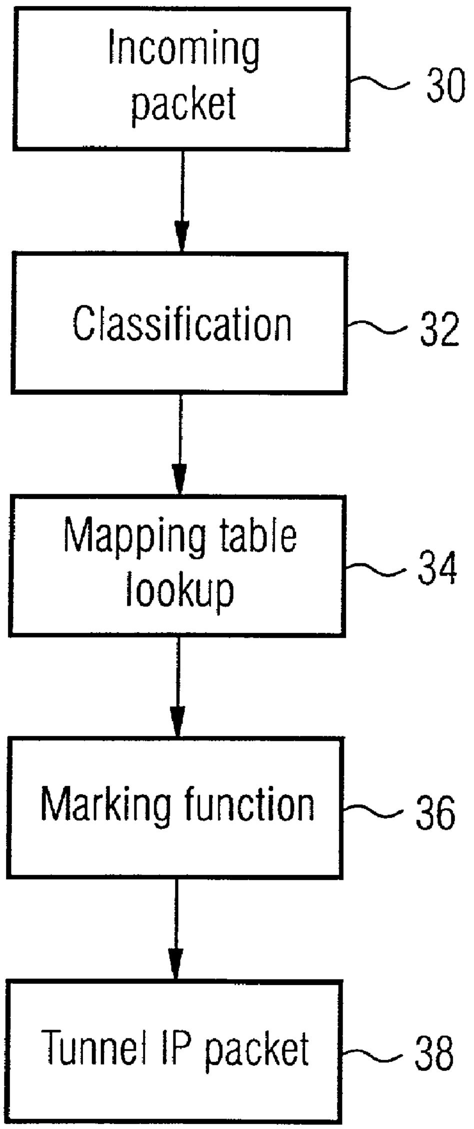

An alternative method according to the invention is described with respect to FIG. 4 which shows flow charts for the marking of data packets in downlink and uplink direction, respectively. In this embodiment, the nodes N in the core network CN process the IP packets on the routing layer LR according to the per hop behavior defined in the packet header. For downlink traffic (FIG. 4*a*), a gateway GPRS support node GGSN can be the edge node between the core network CN and a further communication system FS from which the packets are supplied. In the edge node, the incoming user packets from the further communication system are encapsulated into tunnel IP packets on layer LR. The user packets can be IP packets on layer LA.

After a packet arrives at an edge node, e.g. node EN2, in step 20, the setting of the DS data field defining the quality of service requested in the packet is read in check 22. If the edge node is a GGSN, the setting of the DS field in the packet headers on the application layer LA can be evaluated for this purpose. In lookup procedure 24, the user subscription record is checked which quality of service is to be provided to the user for the requested quality of service. Generally, the lookup procedure 24 has to be performed only for the first packet in a packet flow and the corresponding setting of the per hop behavior can be used for all subsequent packets of the same flow as long as the requested quality of service is unchanged. It is possible to perform the lookup procedure 24 in a device outside the edge node and transfer only the result. Lookup procedure 24 can also take into account a negotiated quality of service.

If the packet does not contain any requested quality of service, the quality of service is provided according to a default value. The default value is preferably best effort service although any other default setting can be defined in the subscription record. If a packet arrives at an edge node EN2 before a connection is set up, the default value can also be the quality of service corresponding to another connection which is already provided to the user and corresponds most closely to the demanded quality. The DS data field in the tunnel IP packets on layer LR is set according to the value from the lookup procedure 24 in marking function 26. The DS data fields in the packets with the corresponding address and port number are then set to the according per hop behavior. Finally, the tunnel IP packets are sent to a node in the core network in step 28.

In the up link case (FIG. 4*b*), the packets from a user application, for example IP packets, are preferably encapsulated for layer LR in the RNC serving the user and acting as the edge node for the core network. For packets arriving from the user equipment at the RNC in step 30, the requested quality of service is checked in classification 32. In contrast to a GGSN, the RNC does not evaluate information on the application layer LA as is shown in the protocol stack of node CR in FIG. 2*a*. Therefore, classification 32 is preferably performed according to the radio access bearer for the connection on the radio link RL1 or according to information provided from another node, especially from a 3G SGSN connecting the RNC to the core network CN. A lookup procedure 34 is performed according to the requested quality of service or according to a default value and the DS data field in the packet header on layer LR is set correspondingly by marking function 36 before the packets are sent into the core network in step 38.

Lookup procedure 34 is generally performed in another node, e.g. a 3G SGSN like node SN in FIG. 2*a*, and the result transferred to the RNC which can not obtain the subscription record directly from the data base DB. To provide the RNC with the information from the subscription record of the user, preferably a communication procedure is performed with the node SN using GTP on layer LI. When the connection is set up, the node SN obtains the user record from the data base DB and stores it as long as a connection, e.g. a radio access bearer is provided to the user equipment with radio link RL1. The node SN then performs the lookup procedure 34 and sends the per hop behavior which is to be set in the packet headers on layer LR to the RNC with the corresponding identification of the microflow of the packets in the GTP identifier on layer LI.

In the same way, a per hop behavior can also be sent from the SGSN to the GGSN for the setting of the packet headers in the down link direction to the user. Similarly, the per hop behavior can be sent from the GGSN to the SGSN if the connection is set up from a further network to the user or from controlling nodes to processing nodes if the communication system processes the traffic and controls the connections in different nodes, i.e. the system has separated traffic and control planes. The transfer of the per hop behavior to the edge node instead of the user subscription record has the advantages that the data traffic in the network is reduced and the look up procedure has only to be performed for the first packet in a microflow.

TABLE 1

Example of a user subscription record

| Requested PHB | PHB according to subscribed service | UMTS service classes |
|---|---|---|
| EF | $AFx_{ir},y_{jr}$ | Conversational class |
| . . . | . . . | Streaming class |
| $AFx_{is},y_{js}$ | $AFx_{ms},y_{ns}$ | |
| . . . | . . . | |
| . . . | . . . | Interactive |

TABLE 1-continued

Example of a user subscription record

| Requested PHB | PHB according to subscribed service | UMTS service classes |
|---|---|---|
| $AFx_{it},y_{jt}$ | $AFx_{mt},y_{nt}$ | class |
| . . . | . . . | |
| BE | BE | Background class |

An example of a user subscription record evaluated for the setting of the DS data field in a UMTS communication system is shown in table 1. In the first column, all existing qualities of service which can be requested by a user are listed. Possible per hop behaviors (PHB) are expedited forwarding (EF), assured forwarding (AF) and best effort service (BE). For assured forwarding, different delay classes x and drop precedences y are defined by the bits of the per hop behavior. The second column contains the quality of service according to the user subscription. It is possible that the first two columns of the table are identical. In most cases, however, the subscribed quality of service will be different from the requested one. Generally it will be lower for one or several per hop behaviors. The third column contains the UMTS quality of service classes which are used for the set up of a connection for the user with the radio access network. It is possible, that only one or some of these classes can be used for a specific subscription.

The result of the check 22 or classification 32 of the user data packet can be any requested per hop behavior from the first column. For the requested per hop behavior, the subscribed behavior is obtained from the second column in lookup 24, 34 and set in the DS data field of the tunnel IP packet in marking function 26, 36. If the user data packet does not contain a requested quality of service, the lookup can be performed for a default behavior, generally best effort service. The processing of the data packets in the access network is performed according to the third column of the table. If the packets arrive over a radio link at a controller CR like an RNC which prepares the packets for the routing layer LR in the core network without evaluating the application layer LA, it is also possible to perform a mapping from the UMTS service classes to the subscribed per hop behavior.

The above embodiments admirably achieve the objects of the invention. However, it will be appreciated that departures can be made by those skilled in the art without departing from the scope of the invention which is limited only by the claims.

The invention claimed is:

1. A method of providing a defined quality of service in a packet switched communication system having a plurality of interconnected nodes for forwarding of data packets, wherein the plurality of interconnected nodes includes an edge node and a plurality of interior nodes, wherein the edge node connects to user equipment or to a further communication system, processes data packets having a data field specifying a handling of the packets, and forwards the processed data packets to the interior nodes, wherein the plurality of interior nodes form a core network through which data packets received from the edge node are forwarded toward a destination, said method comprising:

connecting the edge node to a data base that contains a user subscription for an identified user specifying a quality of service for the identified user;

providing the edge node with quality parameters from the identified user's subscription;

receiving in the edge node, a data packet for the identified user, said packet being received on a first protocol layer;

processing in the edge node, the received data packet for the identified user according to a protocol stack, wherein the data field specifying the handling of the packet is set according to the quality parameters from the identified user's subscription and according to a second quality of service requested for the received data packet on a layer in the protocol stack of the edge node that is different from a lower layer evaluated by the interior nodes for the handling of the packets;

encapsulating the incoming data packet with the processed data field into a data packet on the lower protocol layer for the routing of the data packet; and forwarding the processed data packets by the interior nodes in the core network by performing a differentiated handling of the packets according to the data field set by the edge node, wherein the interior nodes evaluate the data field at the lower layer and route the packets according to the quality parameters specified in the data field.

2. The method according to claim 1, wherein the step of processing the data packet in the edge node includes changing the data field from a previously specified quality of service to a quality of service according to the quality parameters from the identified user's subscription.

3. The method according to claim 2, wherein the data field is changed in response to a traffic load in the communication system.

4. The method according to claim 1, wherein the step of connecting the edge node to a data base includes connecting the edge node to a second node that connects to the data base, wherein the quality parameters from the identified user's subscription are forwarded from the second node to the edge node.

5. The method according to claim 1, wherein the data packets are internet protocol packets and the data field is the differentiated services field in the internet protocol header.

6. The method according to claim 5, wherein the step of setting the data field specifying the handling of the packet according to the quality parameters from the identified user's subscription includes setting unspecified bits in the differentiated services field according to the identified user's subscription, wherein the interior nodes handle the packet according to the unspecified bits.

7. The method according to claim 5, wherein the step of setting the data field specifying the handling of the packet according to the quality parameters from the identified user's subscription includes setting a plurality of bits that specify per hop behavior according to the identified user's subscription.

8. The method according to claim 1, wherein said data base is a location register.

9. The method according to claim 1, wherein each of the plurality of interior nodes that receives the data packet evaluates the data field if the traffic load is above a threshold value.

10. A third generation Serving GPRS Service Node (SGSN) in a packet switched communication system having a plurality of interconnected interior nodes for forwarding of data packets through a core network, wherein the SGSN processes the data packets and is connectable to at least one of the interconnected interior nodes and to user equipment operating in a UMTS Terrestrial Radio Access Network (UTRAN) external to the core network, and the packets include a data field that specifies a handling of the packets in the interconnected interior nodes, said SGSN comprising:

an interface for accessing a data base holding user subscriptions and retrieving parameters specifying a quality of service for an identified user;

means for receiving an incoming data packet on a first protocol layer;

means for determining that the incoming packet is associated with the identified user;

processing means for setting the data field of the incoming packet to specify the handling of the incoming packet by the interconnected interior nodes according to the quality parameters from the identified user's subscription;

wherein the data field specifying the handling of the packet is set according to the quality parameters from the identified user's subscription and according to a second quality of service requested for the received data packet on a layer in the protocol stack of the edge node that is different from a lower layer evaluated by the interior nodes for the handling of the packets; and means for encapsulating the incoming data packet with the processed data field into a data packet on a lower protocol layer for the routing of the data packet and forwarding the data packet to the interconnected interior nodes;

wherein the plurality of interconnected interior nodes perform a differentiated handling of the packets according to the data field set by the SGSN, wherein the interior nodes evaluate the data field at the lower layer and route the packets according to the quality parameters specified in the data field.

11. The SGSN according to claim 10, further comprising means for processing data packets according to a protocol stack, wherein the processing means evaluates data from a first layer in the protocol stack and sets the data field at a second protocol layer different from the first layer, which is evaluated by the plurality of interconnected interior nodes for the handling of the packets, according to the data evaluated from the first protocol layer.

12. The SGSN according to claim 10 wherein the edge node includes a control node and a node for processing packets.

13. A program unit on a data carrier or loadable into a third generation Serving GPRS Service Node (SGSN) in a packet switched communication system, wherein the SGSN provides connections and processes packets sent between a UMTS Terrestrial Radio Access Network (UTRAN) and interior nodes in a core network which perform a differentiated handling of the packets according to a data field in the data packets, wherein the program unit comprises:

means for obtaining from a user subscription, parameters for an identified user served by the SGSN, said parameters specifying a quality of service for the identified user;

means for receiving an incoming data packet on a first protocol layer;

means for determining that the incoming packet is associated with the identified user;

means for processing the incoming data packet according to a protocol stack, wherein the data field in the incoming packet is set according to the parameters for the identified user and according to a second quality of service requested for the received data packet on a layer in the protocol stack of the edge node that is different from a lower layer evaluated by the interior nodes for the handling of the packets;

means for encapsulating the incoming data packet with the processed data field into a data packet on the lower protocol layer for the routing of the data packet; and means for forwarding the processed data packet to an interior node in the core network;

whereby the program unit causes the interior node to perform a differentiated handling of the data packet according to the data field set by the program unit, wherein the interior nodes evaluate the data field at the lower layer and route the packets according to the quality parameters specified in the data field.

* * * * *

UNITED STATES PATENT AND TRADEMARK OFFICE

CERTIFICATE OF CORRECTION

PATENT NO. : 7,180,860 B2
APPLICATION NO. : 09/742857
DATED : February 20, 2007
INVENTOR(S) : Fonden et al.

It is certified that error appears in the above-identified patent and that said Letters Patent is hereby corrected as shown below:

In Column 1, Line 53, after “visitor” insert -- location --.

In Column 4, Line 49, delete “proposed as” and insert -- preferably the --, therefor.

In Column 4, Line 25, delete “HILR” and insert -- HLR --, therefor.

In Column 2, Line 22-26, under “SUMMARY OF THE INVENTION”, delete paragraph “According to the invention, the method described in claim 1 is performed. The invention is also embodied in devices and software programs as described in claims 11, 16 and 18. Advantageous embodiments are described in claims 2 to 10, 12 to 15, 17 and 19.”

In Column 2, Line 21, under “SUMMARY OF THE INVENTION”, insert paragraph -- It is therefore an object of the present invention to obviate these disadvantages and provide a method to differentiate the priority of users in the core network of a packet switched communication system. It is a further object, to develop a method which is easy to implement in the communication network. It is still another object to provide devices and programs which perform the method. --.

In Column 7, Line 49, delete “Ut” and insert -- UE --, therefor.

Signed and Sealed this

Second Day of September, 2008

Jon W. Dudas

JON W. DUDAS
*Director of the United States Patent and Trademark Office*